(12) United States Patent
Perham

(10) Patent No.: US 11,711,050 B2
(45) Date of Patent: Jul. 25, 2023

(54) SOLAR POWERED SOLAR TRACKING SYSTEM

(71) Applicant: Robert Bradley Perham, Huntington, NY (US)

(72) Inventor: Robert Bradley Perham, Huntington, NY (US)

(*) Notice: Subject to any disclaimer, the term of this patent is extended or adjusted under 35 U.S.C. 154(b) by 0 days.

(21) Appl. No.: 17/385,812

(22) Filed: Jul. 26, 2021

(65) Prior Publication Data

US 2022/0029575 A1 Jan. 27, 2022

Related U.S. Application Data

(60) Provisional application No. 63/184,279, filed on May 5, 2021, provisional application No. 63/056,219, filed on Jul. 24, 2020.

(51) Int. Cl.
*H02S 20/32* (2014.01)

(52) U.S. Cl.
CPC .................................. *H02S 20/32* (2014.12)

(58) Field of Classification Search
CPC .................................. H02S 20/32; F24S 50/20
See application file for complete search history.

(56) References Cited

U.S. PATENT DOCUMENTS

| | | | |
|---|---|---|---|
| 4,347,834 A * | 9/1982 | York | F24S 30/48 126/688 |
| 6,691,701 B1 * | 2/2004 | Roth | F24S 50/00 126/685 |
| 2011/0041834 A1 * | 2/2011 | Liao | F24S 30/452 126/605 |

* cited by examiner

*Primary Examiner* — Thanh Luu
(74) *Attorney, Agent, or Firm* — KOS IP Law LLP

(57) ABSTRACT

A solar tracking system includes a base member, a first shaft rotatably coupled to the base member, a support arm pivotably coupled to the first shaft, a second shaft having a first end and an opposing second end, the first end rotatably coupled to the support arm, a solar rack pivotably coupled to the second end of the second shaft, and a mass positioner configured to change an angle between the support arm and the first shaft by moving a predetermined mass between a first position and a second position.

11 Claims, 9 Drawing Sheets

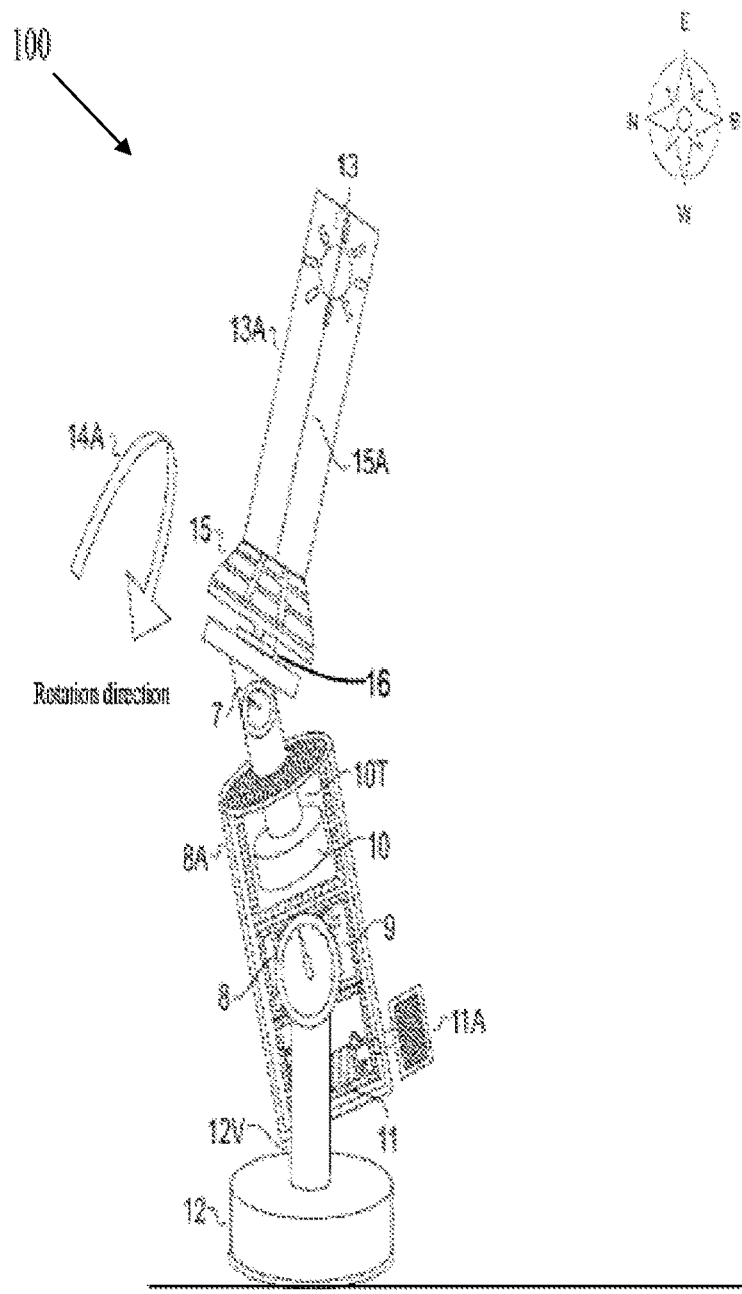
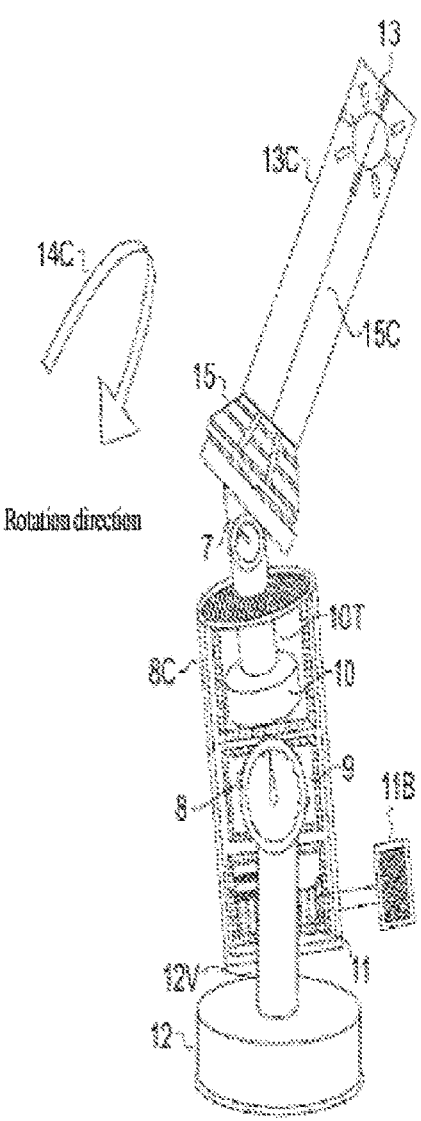
FIG. 2
FIG. 3

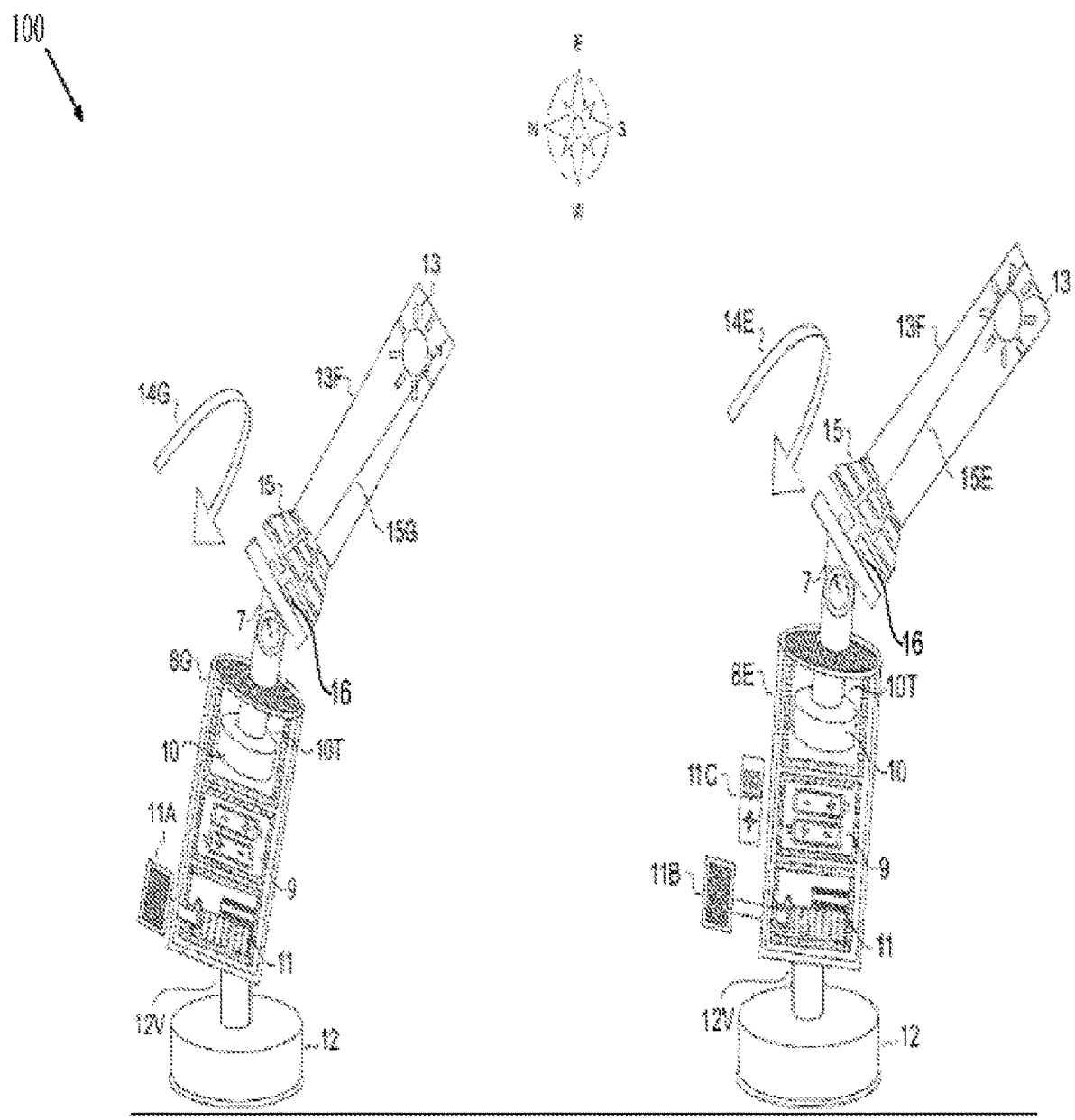
FIG. 12                    FIG. 13

SOLAR POWERED SOLAR TRACKING SYSTEM

BACKGROUND OF THE INVENTION

1. Field of the Invention

The present general inventive concept relates to tracking systems, and more particularly to photovoltaic (P-V) solar panel tracking systems.

2. Background

Active solar tracking systems either constantly or periodically reposition one or both axes of an array of solar panels to maintain the solar panels' surfaces at or close to perpendicular with the sun's position during some or all of the daylight (diurnal) time period in order to capture a greater percentage of the available photovoltaic (P-V) energy within the sun's direct rays.

P-V solar panels collect solar irradiation, which is a direct current (DC) form of energy. Flat P-V solar panels collect, capture, absorb P-V solar energy most efficiently when their energy collecting surfaces' 'normal' line is at or close to the sun's direct rays. A 'normal' line is a line drawn perpendicular to a surface at the location where a ray of light strikes the solar panel's surface.

P-V solar panels collect the most available energy within the sun's direct rays when both their azimuthal (X) and altitudinal (Y) axes are perpendicular or 'normal' to the sun's direct rays. Direct rays contain over 90% of the P-V energy available for collection by solar panels.

Recently, there have been not only increases in the frequency and severity of adverse climate condition related power grid failures, but also almost daily occurrences of "ransom based" cyber-attacks on many vital parts of our infrastructure. It has been known for some time that technology exists for malware to disable entire electrical power grids.

Such events will almost certainly continue to occur. Therefore, there is not only an increased need for more "highly efficient" renewable energy collecting devices that will continue to function without an external source of power, but also for ones that are neither dependent on, nor connected to the Internet and therefore would be 'impervious' to cyber-attacks.

Therefore, what is needed is a solar panel tracking system that maintains solar panels substantially perpendicular to the sun's direct rays during all hours of the day without an external source of power and neither depends on, nor connected to the internet.

SUMMARY OF THE INVENTION

Certain of the foregoing and related aspects are readily attained according to the present general inventive concept by providing a solar tracking system including a base member, a first shaft rotatably coupled to the base member, a support arm pivotably coupled to the first shaft, a second shaft having a first end and an opposing second end, the first end rotatably coupled to the support arm, a solar rack pivotably coupled to the second end of the second shaft, and a mass positioner configured to change an angle between the support arm and the first shaft by moving a predetermined mass between a first position and a second position.

The solar tracking system may further include a tilt angle adjuster to adjust a tilt angle between the solar rack and a longitudinal axis of the second shaft.

The solar tracking system may further include a swivel base disposed between the solar rack and the tilt angle adjuster configured to allow the solar rack to rotate.

The tilt angle may be equal to a latitude of where the base member is located.

The solar rack may include at least one photovoltaic energy collector panel.

The solar tracking system may further include a first rotator device coupled to the support arm and configured to rotate the second shaft.

The solar tracking system may further include a second rotator device coupled to the base member and configured to rotate the first shaft.

The mass positioner may include an actuator to move the predetermined mass between the first position and the second position.

The support arm may be positioned at a first angle with respect to the base member when the mass is located at the first position.

The support arm may be positioned at a second angle with respect to the base member when the mass is located at the second position.

The first angle may be 18 degrees and the second angle may be 6 degrees.

The solar tracking system may further include a rechargeable battery connected to at least one of the first rotator device and the second rotator device.

The mass positioner may further include a linear actuator disposed within the support arm.

Additional features and embodiments of the present general inventive concept will be apparent from the following detailed description, drawings, and claims.

BRIEF DESCRIPTION OF THE DRAWINGS

The following example embodiments are representative of example techniques and structures designed to carry out the objects of the present general inventive concept, but the present general inventive concept is not limited to these example embodiments. In the accompanying drawings and illustrations, the sizes and relative sizes, shapes, and qualities of lines, entities, and regions may be exaggerated for clarity. A wide variety of additional embodiments will be more readily understood and appreciated through the following detailed description of the example embodiments, with reference to the accompanying drawings in which:

FIG. 2 is a perspective side view of a photovoltaic (P-V) solar panel tracking system at solar noon according to an example of the present general inventive concept, wherein the Angle Of Incidence (AOI) between the sun's direct rays and the solar panels' normal line is zero degrees whenever the solar panel rotator shaft support arm's tilt angle is −18.0 degrees away from the sun and the earth's axial obliquity is +18.0 degrees toward the sun.

FIG. 3 is a perspective side view of the photovoltaic (P-V) solar panel tracking system wherein the AOI between the sun's direct rays and the solar panels' normal line is zero degrees whenever the solar panel rotator shaft support arm's tilt angle is −6.0 degrees away from the sun and the earth's axial obliquity is +6.0 degrees toward the sun.

FIG. 12 is a perspective side view of the photovoltaic (P-V) solar panel tracking system wherein the AOI between the sun's direct rays and the solar panels' normal line is +6.0 degrees whenever the solar panel rotator shaft support arm's tilt angle is +18.0 degrees toward the sun and the earth's axial obliquity is −12.0 degrees away from the sun.

FIG. 13 is a perspective side view of the photovoltaic (P-V) solar panel tracking system wherein the AOI between the sun's direct rays and the solar panels' normal line is −6.0 degrees whenever the solar panel rotator shaft support arm's tilt angle is +6.0 degrees toward the sun and the earth's axial obliquity is −12.0 degrees away from the sun.

DESCRIPTION OF THE PREFERRED EMBODIMENTS

Figure 1:
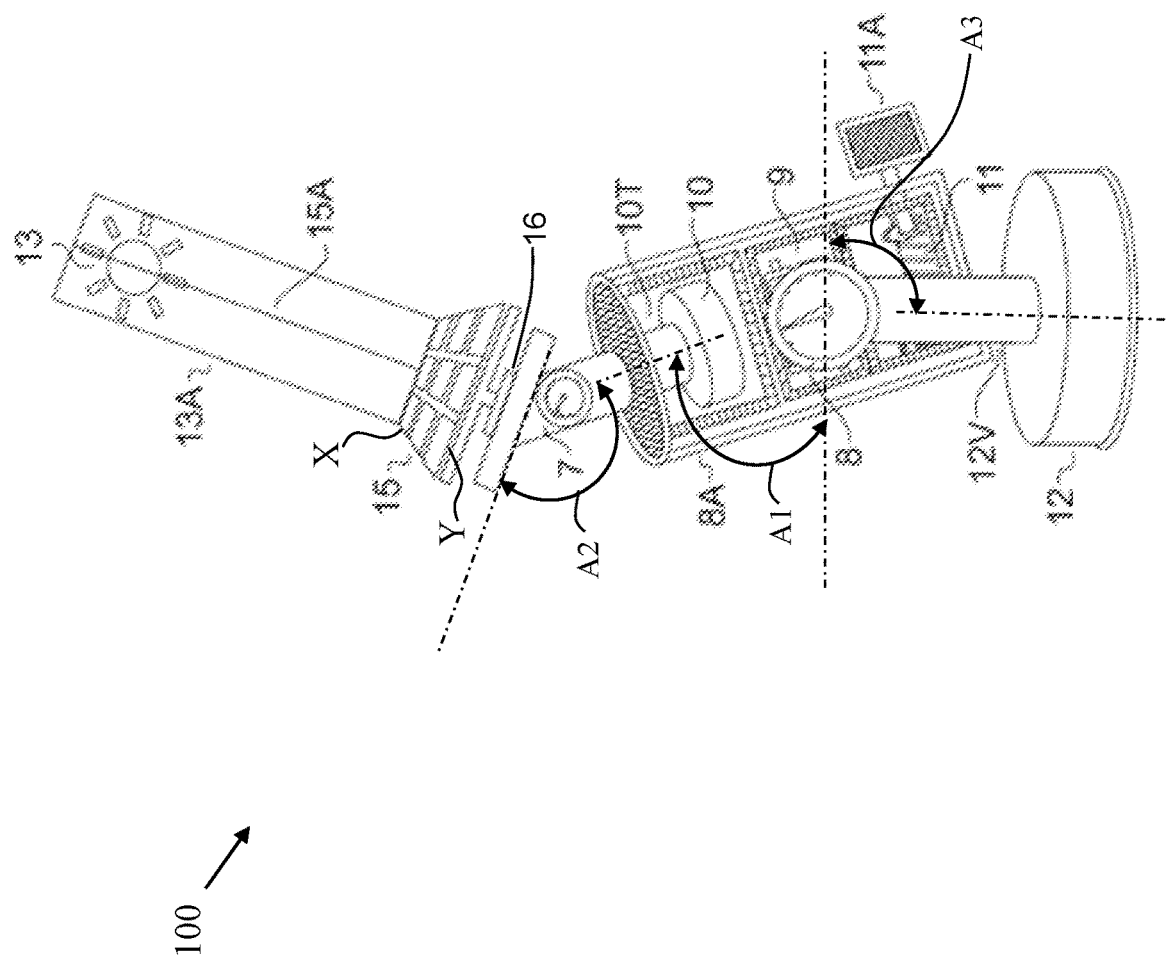
FIG. 1 is a perspective side view of a photovoltaic (P-V) solar panel tracking system according to an example of the present general inventive concept.

The present inventive concept will now be described more fully with reference to the accompanying drawings, in which exemplary embodiments of the present general inventive concept are illustrated. The inventive concept may, however, be embodied in many different forms and should not be construed as being limited to the embodiments set forth herein; rather, these embodiments are provided so that this disclosure will be thorough and complete, and will fully convey the concept of the invention to those skilled in the art. Like reference numerals refer to like elements throughout.

The photovoltaic (P-V) solar panel tracking system according to an example embodiment of the present general inventive concept is designed and configured to limit the maximum diurnal azimuthal and altitudinal AOIs between the sun's direct rays and the solar panels' normal line to less than +/−8.0 degrees thereby ensuring the capture of a minimum 99% of the available P-V solar energy. As used through this application the term, "at or close to perpendicular" shall mean that the maximum diurnal azimuthal and altitudinal AOIs between the sun's direct rays and the solar panels' normal line is +/−8.0 degrees. Research shows that when the AOI between the sun's direct rays and the 'normal' of P-V solar panels is above +/−8.0 degrees, there is a dramatic increase in the amount of direct power loss with each degree of misalignment (AOI) above +/−8.0 degrees.

Indirect or diffuse rays contain much less P-V energy than direct rays and are the entire source of daylight when direct rays are broken up by trees, blocked by clouds or dispersed by high levels of air pollution or other atmospheric conditions that impede the transmission of the sun's direct rays.

Single axis solar tracking mounting systems (S.A.S.T.s) are able to capture 25% to 35% more of the available P-V solar energy than fixed ground and/or rooftop types of P-V solar panel mounting systems and are frequently used in large scale commercial solar farms or utility scale settings.

Dual axis solar tracking mounting systems (D.A.S.T.s) can boost the efficiency in available P-V energy collection over that of a S.A.S.T. by another 5% to 10%.

However, due to its many drawbacks, D.A.S.T.s are only efficacious in being even close to "cost effective" is at higher latitudes where there are wide variations in the diurnal sunrise and sunset times at different times of year, and in such cases only when space is limited, and a small diameter operating footprint is essential.

Some of the D.A.S.T. many drawbacks that have the greatest negative impact on their efficacy include their highest initial cost, the most number of complex moving parts along with the related frequent maintenance requirements, a two decades long return on investment period and a poor M.T.B.F. rating.

Recently, there have not only been significant increases in both the frequency and severity of adverse climate condition related power grid failures, but also almost daily occurrences of "ransom based" cyber-attacks on many vital parts of our infrastructure. It has been known for some time that technology exists for cyber extortionists to disable entire electrical power grids with malware.

Such events will almost certainly continue to happen. Therefore, there is not only an increased need for more "highly efficient" renewable energy collecting devices that can function without an external source of power, but also for ones that are neither dependent on, nor connected to the Internet and therefore would be 'impervious' to cyber-attacks. Even worse, if and when it happens in the future to one or more of the most vital parts of our infrastructure, the goal of attack may not be 'ransom-based' but rather to permanently disable vital parts of our infrastructure and no amount of money will be offered to remove the malware. Therefore, what is needed is a solar powered, highly efficient solar panel tracking system that maintains the 'normal' of their P-V solar panels' energy collecting surfaces 'at or close' to the sun's direct rays, whenever and wherever they are available without the need for, or connected to the internet in order to be impervious to cyber-attacks.

In addition, there is now a tremendous need for thousands of new charging stations for the increasing number of Electric Vehicles (EVs). Given the recent shutdowns of various "internet connected" power, water, gas, oil and other public utility systems by cyber-attacks, it is clear that these systems are subject to outside threats and unforeseen shutdowns. "Cyber-proof" and highly efficient solar powered EV charging stations will not only be necessary for confirmed "EV" new car buyers, but also a tremendous incentive for those that are just considering switching from gas powered vehicles to EV.

The present general inventive concept addresses these needs and others.

The device according to the present general inventive concept is a highly efficient, solar powered, active solar tracking mounting system with few D/C powered, low energy consuming, short duration moving parts. It neither requires an external source of power nor an internet connection to collect over 99% of the available diurnal P-V energy in the sun's direct rays whenever and wherever they are available.

The basic design of the device according to the present general inventive concept is that the AOI between the sun's direct rays and the energy collecting surfaces of the solar panels' 'normal' line is equal to the sum of the earth's daily axial obliquity and the tilt angle of the invention's solar panels' rotator shaft support arm 10T.

An 'AOI' is defined as: "the angle which an incident line or ray makes with a perpendicular to the surface at the point of incidence." A 'normal' line is: "a perpendicular line to the tangent of a surface."

The earth's +23.5 degree axial tilt angle is called 'obliquity' and is defined as the angle between an object's rotational axis and its orbital axis or equivalently, the angle between its equatorial plane and its orbital plane.

That is, the device according to the present general inventive concept maintains the solar panels 15 azimuthal and altitudinal maximum AOIs between the sun's position (and it's direct rays when available) and the solar panels' 'normal' to less than +/−8.0 degrees at all times during its operation at every location on the earth's surface by rotating the solar panels around a tilted shaft (i.e., second shaft), without the use of an external power source.

The present general inventive concept includes an array of solar panels that periodically reorient the azimuthal (X) and altitudinal (Y) axes of their energy collecting surfaces at different intervals and number of degrees to limit the maximum AOI between the sun's direct rays and the solar panels' normal to less than +/−8.0 degrees.

The amount of "Direct power loss" at different degrees of misalignment or 'AOIs' of either or both azimuthal and altitudinal axes of P-V solar panels can be seen on a chart on the 'ResearchGate.Net' website. The primary basis for the invention's limiting the maximum AOI between the sun's direct rays and the solar panels' normal to less than +/−8.0 degrees is due to the sharp increase in the amount of Direct power loss from 1.000% at an AOI of approximately 8 degrees up to 100.000% at 90 degrees.

The photovoltaic (P-V) solar panel tracking system's operating design rotates a rack of multiple P-V solar panels +15.0 degrees clockwise each diurnal hour on the hour when the solar panels' azimuthal normal line's AOI is −7.5 degrees east of the sun's position to where the rack's azimuthal normal line's AOI is +7.5 degrees west of the sun's position.

The altitudinal zenith or 'apogee' of the sun's daily orbital path at each of the 181 different latitudes occurs at solar noon and is determined by the amount and direction of the earth's obliquity either toward or away from the sun on any given day.

Resultant to the earth's elliptical shaped yearly revolution around the sun, unlike the 'constant' direction and speed of the horizontal azimuthal rotation, the amount and direction of the earth's obliquity, which are the two determining factors of the sun's daily apogee, vary 'slightly and irregularly' each and every day of the year.

The photovoltaic (P-V) solar panel tracking system's end-user (e.g., system administrator) initiates an altitudinal tilt change of the solar panels' normal −12.0 degrees downward 'on or about' the same three dates each year between the installation site's summer solstice until its winter solstice when their altitudinal normal line's AOI is +6.0 degrees above the sun's daily apogee to where their normal line's AOI is −6.0 degrees below the sun's slightly and irregularly decreasing apogee after the −12 degree downward tilt change. This altitudinal tilt change, and all similar changes, are initiated within 200 feet of the device due to the use of a WiFi Direct P2P remote control devices.

The photovoltaic (P-V) solar panel tracking system's end-user (e.g., system administrator) initiates an altitudinal tilt change of the solar panels' normal +12.0 degrees upward 'on or about' the same three dates each year between the installation site's winter solstice until its summer solstice when the altitudinal normal line's AOI is −6.0 degrees below the sun's slightly and irregularly increasing daily apogee to where their normal line's AOI is +6.0 degrees above the sun's apogee after the +12 degree upward tilt change.

The total amount of the photovoltaic (P-V) solar panel tracking system's daily operating energy will require only a fraction of the P-V (D/C) energy normally collected by the device on a sunny day. The large amount of P-V D/C energy previously collected and stored energy on the high storage capacity solar rechargeable battery 9 provides backup operating power for when P-V energy is available for collection after any of the inevitable prolonged time periods when there was little or no available P-V energy collected.

The photovoltaic (P-V) solar panel tracking system is specifically designed to not only utilize only methods that do not require expensive, complex, hard to troubleshoot computerized algorithms, or G.P.S., but also do not get connected to the Internet to perform its azimuthal and altitudinal position changes of the solar panels.

Reasons for the invention's intentional avoidance of the use of the afore described 'methods of operation' (M.O.s) that require a Bluetooth, NFC and/or Internet connection, include not only cost effectiveness, reliability, ease of troubleshooting and global efficacy, regardless of whether or not Internet access exists, but also for protection from cyber-attacks by our adversarial countries.

Research shows that photovoltaic (P-V) solar panels capture 99% of the available diurnal solar energy whenever the AOI between the normal line of their energy collecting surfaces and the sun's direct rays is less than +/−8.0 degrees of the azimuthal (X) and altitudinal (Y) axes of their planar energy collecting surfaces.

The primary goal of all active solar trackers is to either constantly or periodically reorient the azimuthal (X axis) and/or altitudinal (Y axis) angle of the solar panels' normal line to remain 'at or close' to the sun's position (and its direct rays when available) for all or some portion of its daily (diurnal) orbital path at the solar tracker's location.

Every coordinate on the earth's surface where an active solar tracker is located is constantly rotating on the earth's +23.5 degree tilted axis, 360 degrees each day in the counterclockwise direction while simultaneously revolving 360 degrees each year around the sun's position in the center of the earth's elliptical shaped orbital path around it. If a rack of solar panels at any coordinate on the earth's surface at any given time of day or night on any day of the year is periodically rotated +15.0 degrees each hour in the clockwise direction starting when the solar panels' azimuthal (X) axes are −7.5 degrees (west) of the sun's position, it will result in an azimuthal AOI range of −7.5 to +7.5 degrees between the solar panels' X axes' normal line and the sun's position.

The present general inventive concept limits the maximum azimuthal and altitudinal AOI between its solar panels' "normal" during the sun's diurnal orbital path to less than +/−8.0 degrees by implementing the afore described periodic +15 degree clockwise hourly rotations of the solar panels around the tilted shaft (i.e., the second shaft).

FIG. 1 is a perspective side view of a photovoltaic (P-V) solar panel tracking system 100 according to an example of the present general inventive concept.

Referring now to FIG. 1, an example embodiment of the present general inventive concept is illustrated. The solar panel tracking system 100 utilizes a first rotator device 10, powered by a D/C high storage capacity, solar rechargeable battery (not illustrated), to rotate a plurality of photovoltaic (P-V) solar panels 15 attached to a rotatable tilted shaft 10T (i.e., a second shaft) via a 360 degree swivel base device 16 at the angle of the installation site's latitude shown on an inclinometer 7. Diurnal rotations of +15.0 degrees are performed by the rotator device 10 each hour on the hour when the azimuthal axes' normal of the solar panels 15 is −7.5 degrees (east) of the sun's position to where they are +7.5 degrees (west) of the sun. The 360-degree swivel base device 16 is designed and/or configured to mitigate lateral wind gusts on the solar panels 15 by allowing the solar panels 15 to swing or swivel in a back-and-forth direction in response to external opposing forces. In addition, the 360-degree swivel base device 16 is designed and/or configured to minimize a circular footprint required to operate the solar panel tracking system 100 according to the present general inventive concept.

In the present embodiment, the solar tracking system 100 includes a base member 12, a first shaft 12V rotatably coupled to the base member 12, a support arm 8 pivotably coupled to the first shaft 12V, a second shaft 10T rotatably coupled to the support arm 8, a solar rack 15 pivotably coupled to the second shaft 10T, and a mass positioner 11 configured to move a predetermined mass 11a from a first position to a second position. The mass positioner 11 may be coupled to the support arm 8. However, the present general inventive concept is not limited thereto.

In the present embodiment, the mass positioner 11 includes an actuator that is coupled to a predetermined mass 11A and configured to change an angle between the support arm 8 and the first shaft 12V by moving the predetermined mass 11A between a first position P1 and a second position P2.

In alternative embodiments, the solar tracking system 100 further includes a tilt angle adjuster 17 designed and configured to adjust a tilt angle A2 between the solar rack 15 and a longitudinal axis of the second shaft 10T.

In alternative embodiments, the solar tracking system 100 further includes a swivel base 16 disposed between the solar rack 15 and the tilt angle adjuster 17 configured to allow the solar rack 15 to rotate 360 degrees.

In the present embodiment, a user may adjust the tilt angle A2 to equal to a latitude of where the solar tracking system 100 is located.

In alternative embodiments, the solar rack 15 includes at least one photovoltaic energy collector panel.

In alternative embodiments, the solar tracking system 100 further includes a first rotator device 10 coupled to the support arm 8 and configured to rotate the second shaft 10T and a second rotator device 12 coupled to the base member 12 and configured to rotate the first shaft 12V.

In the present embodiment, the mass positioner 11 includes an actuator 11 to move the predetermined mass 11A between a first position P1 and a different second position P2. As a result, the support arm is positioned at a first angle with respect to the base member when the predetermined mass is located at the first position P1 and at a second with respect to the base member when the predetermined mass is located at the second position P2. The first angle may be about 18 degrees and the second angle may be about 6 degrees.

The solar tracking system may further include a solar rechargeable battery connected to at least one of the first rotator device and the second rotator device. However, the present general inventive concept is not limited thereto.

The mass positioner 11 may further includes a linear piston actuator 11 disposed within the support arm 8.

The solar panel tracking system 100 is able to limit, to less than +/−8.0 degrees, the maximum azimuthal AOI between the solar panels 'X axis' X1 normal and the sun's position during its constant speed, constant direction orbital path for any time period at any location on any day of the year.

The solar panel tracking system 100 is also able to limit, to less than +/−8.0 degrees, the maximum altitudinal AOI between the solar panels 'Y axis' Y1 normal and the sun's position during its entire diurnal orbital path's sunrise to sunset time period and apogee (zenith), which not only both vary each day at the same location, but also vary on the same day at every location at a different latitude.

Accordingly, the solar panel tracking system 100 can capture over 99% of the available P-V energy within the sun's direct rays 13A without the need for, or use of an external power source, computerized algorithms, router, global positioning system (GPS) or Internet connection. This makes it efficacious in P-V solar energy collection whenever and wherever there is sunlight, and impervious to any and all cyber-attacks.

The earth revolves around the sun in an elliptical shaped orbit. Every ellipse not only has a "major axis" which is a straight line between the two furthest points of the orbit's elliptical (oval) shape, but also has a "minor axis" which is a straight line between the two closest points of the orbit's elliptical shape. The sun is in the center of the earth's elliptical shaped yearly orbit around it and the distance from the sun to each of the two furthest points of the earth's elliptical shaped orbit is the same and they are both called 'semi-major' axes. The distance from the sun to each of the two closest points of the ellipse is also the same and they are both called 'semi-minor' axes.

In the northern hemisphere, the earth's 23.5 degree axial tilt is "directly toward" the sun as it crosses the summer solstice's semi-major axis of the earth's elliptical orbit around the sun that occurs on or about June $22^{nd}$.

FIG. 1A is a perspective side view of the photovoltaic (P-V) solar panel tracking system 100 wherein the AOI between the sun's direct rays and the solar panels' 15 normal line is −6.0 degrees whenever the solar panel rotator shaft support arm's tilt angle is −18.0 degrees away from the sun and the earth's axial obliquity is +12.0 degrees toward the sun.

Referring to FIG. 1A, the rotatable tilted shaft 10T remains at −18.0 degrees from approximately two months prior to the summer solstice when the amount of the earth's obliquity toward the sun is increasing slightly and irregularly each day from +12.0 to +23.5 degrees toward the sun on the summer solstice. Further, the rotatable tilted shaft 10T remains at −18 degrees for the two months following the summer solstice when the amount of the obliquity toward the sun is decreasing slightly and irregularly each day from +23.5 back to +12.0 degrees.

The range of the altitudinal AOI between the solar panels 'Y axis' normal and the sun's direct rays during the entire four month period ranges from a maximum +6.0 degree AOI approximately two months prior to the summer semi-major axis of the earth's yearly orbit to a −5.5 degree AOI on the summer solstice and back to the maximum +6.0 degree AOI approximately two months after the summer solstice.

Approximately one month prior to the autumnal equinox when the amount of the earth's obliquity is +12.0 degrees toward the sun, the angle of the rotatable tilted shaft 10T is adjusted from −18.0 degrees away from the sun (as shown in FIG. 1A) to −6.0 degrees away from the sun (as shown in FIG. 1C) by the full extension of the linear piston 11 (i.e., mass positioner) (11A in FIG. 1A; 11B in FIG. 1C) of the actuator 11 from a first position (shown in FIG. 1A) to a second position (shown in FIG. 1C).

FIG. 1C is a perspective side view of the photovoltaic (P-V) solar panel tracking system wherein the AOI between the sun's direct rays and the solar panels' normal line is +6.0 degrees whenever the solar panel rotator shaft support arm's tilt angle of −6.0 degrees away from the sun and the earth's axial obliquity is +12.0 degrees toward the sun.

In the northern hemisphere the earth's 23.5 degree axial tilt is neither toward nor away from the sun as it crosses the autumnal equinox's semi-minor axis of the earth's elliptical orbit around the sun that occurs on or about September $23^{rd}$.

FIG. 2C is a perspective side view of the photovoltaic (P-V) solar panel tracking system 100 wherein the AOI between the sun's direct rays and the solar panels' normal line is −6.0 degrees whenever the solar panel rotator shaft support arm's tilt angle is −6.0 degrees away from the sun and the earth's axial obliquity is zero degrees as it is on the hemisphere's autumnal equinox.

FIG. 2E is a perspective side view of the photovoltaic (P-V) solar panel tracking system wherein the AOI between the sun's direct rays and the solar panels' normal line is +6.0 degrees whenever the solar panel rotator shaft support arm's tilt angle is +6.0 degrees toward the sun and the earth's axial obliquity is zero degrees as it is on the hemisphere's autumnal equinox.

On the autumnal equinox when the earth's axial obliquity is 0.0 degrees and reverses direction from toward the sun to away from the sun both the main vertical support shaft 12V and the tilted rotatable shaft 10T are rotated 180 degrees which reverses the amount and direction of the tilted rotatable shaft 10T from −6.0 degrees away from the sun shown in FIG. 2C to +6.0 degrees toward the sun as shown in FIG. 2E.

The amount of the altitudinal misalignment or "AOI" between the solar panels 'Y axis' normal and the sun's position during the entire one month period' prior to the autumnal equinox ranges from a maximum −6.0 degrees prior to the 180 degree dual rotations to an equal and opposite maximum +6.0 degrees after the dual rotations. For the entire two month period from one month before the autumnal equinox until one month after the autumnal equinox, the maximum AOI between the sun's position and the solar panels 'normal' is less than +/−8.0 degrees and will therefore collect more than 99% of the available P-V solar energy.

FIG. 3E is a perspective side view of the photovoltaic (P-V) solar panel tracking system wherein the AOI between the sun's direct rays and the solar panels' normal line is −6.0 degrees whenever the solar panel rotator shaft support arm's tilt angle is +6.0 degrees toward the sun and the earth's axial obliquity is −12.0 degrees away from the sun.

FIG. 3G is a perspective side view of the photovoltaic (P-V) solar panel tracking system 100 wherein the AOI between the sun's direct rays and the solar panels' normal line is +6.0 degrees whenever the solar panel rotator shaft support arm's tilt angle is +18.0 degrees toward the sun and the earth's axial obliquity is −12.0 degrees away from the sun.

In the northern hemisphere the earth's 23.5 degree axial tilt is directly 'away from' the sun as it crosses the winter solstice's semi-major axis of the earth's elliptical orbit around the sun that occurs 'on or about' December 22nd.

Approximately one month after the autumnal equinox when the amount of the earth's obliquity is −12.0 degrees away from the sun, the angle of the tilted rotatable shaft 10T is adjusted from +6.0 degrees toward the sun shown in FIG. 3E to +18.0 degrees toward the sun shown in FIG. 3G by the full retraction of the actuator's 11 linear piston's 11B position to its 11A position.

Figures 4, 5:
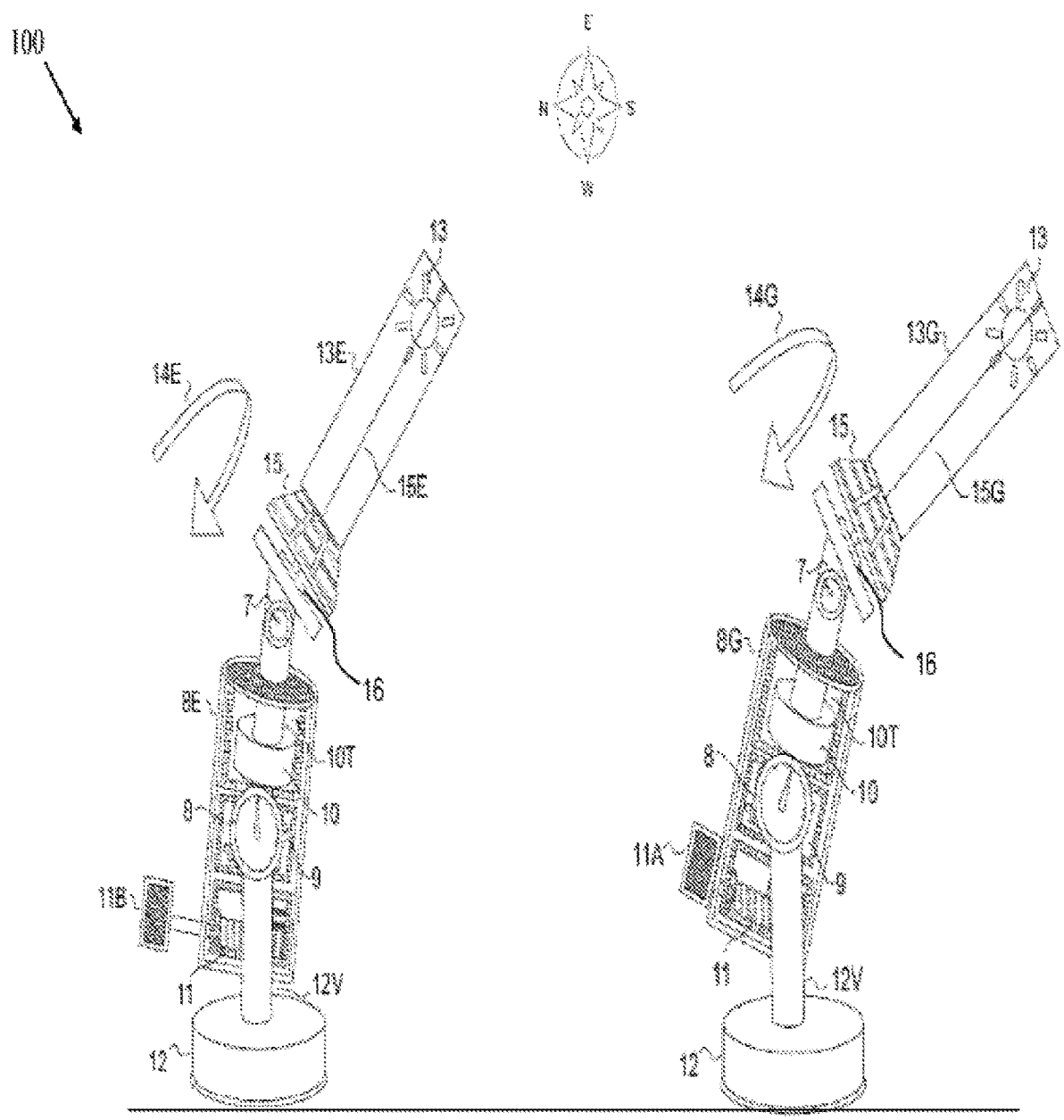
FIG. 4 is a perspective side view of the photovoltaic (P-V) solar panel tracking system wherein the AOI between the sun's direct rays and the solar panels' normal line is zero degrees whenever the solar panel rotator shaft support arm's tilt angle is +6.0 degrees toward the sun and the earth's axial obliquity is −6.0 degrees away from the sun.
FIG. 5 is a perspective side view of the photovoltaic (P-V) solar panel tracking system wherein the AOI between the sun's direct rays and the solar panels' normal line is zero degrees whenever the solar panel rotator shaft support arm's tilt angle is +18.0 degrees toward the sun and the earth's axial obliquity is −18.0 degrees away from the sun.

FIG. 4G is a perspective side view of the photovoltaic (P-V) solar panel tracking system 100 wherein the AOI between the sun's direct rays and the solar panels' normal line is +6.0 degrees whenever the solar panel rotator shaft support arm's tilt angle is +18.0 degrees toward the sun and the earth's axial obliquity is −12.0 degrees away from the sun.

FIG. 4E is a perspective side view of the photovoltaic (P-V) solar panel tracking system wherein the AOI between the sun's direct rays and the solar panels' normal line is −6.0 degrees whenever the solar panel rotator shaft support arm's tilt angle is +6.0 degrees toward the sun and the earth's axial obliquity is −12.0 degrees away from the sun.

The tilted rotatable shaft 10T remains at +18.0 degrees (shown in FIG. 4G) from approximately 'two months prior to the winter solstice' at which time the amount of the earth's obliquity 'away from' the sun is increasing slightly and irregularly each day from −12.0 to −23.5 degrees away from the sun on the winter solstice and the tilted rotatable shaft 10T remains at +18 degrees for approximately 'two months following the winter solstice' at which time the amount of the obliquity 'away from' the sun is decreasing slightly and irregularly each day from −23.5 back to −12.0 degrees.

The range of the altitudinal AOI between the solar panels 'Y axis' normal and the sun's direct rays during the entire four month period ranges from a maximum −6.0 degree AOI approximately two months prior to the summer solstice to a +5.5 degree AOI on the summer solstice and back to the maximum −6.0 degree AOI approximately two months after the summer solstice.

Approximately one month prior to the vernal equinox when the amount of the earth's obliquity is −12.0 degrees away from the sun, the angle of the tilted rotatable shaft 10T is adjusted from +18.0 degrees 'toward the sun' shown in FIG. 4G to +6.0 degrees 'toward the sun' shown in FIG. 4E by the full extension of the actuator's 11 linear piston's 11A position to its 11B position.

FIG. 5E is a perspective side view of the photovoltaic (P-V) solar panel tracking system wherein the AOI between the sun's direct rays and the solar panels' normal line is +6.0 degrees whenever the solar panel rotator shaft support arm's tilt angle is +6.0 degrees toward the sun and the earth's axial obliquity is zero degrees as it is on the hemisphere's vernal equinox.

FIG. 5C is a perspective side view of the photovoltaic (P-V) solar panel tracking system wherein the AOI between the sun's direct rays and the solar panels' normal line is −6.0 degrees whenever the solar panel rotator shaft support arm's tilt angle is −6.0 degrees away from the sun and the earth's axial obliquity is zero degrees as it is on the hemisphere's vernal equinox.

Approximately one month later, on the vernal equinox when the earth's axial obliquity is 0.0 degrees and reverses direction from 'away from' the sun to 'toward the sun' both the main vertical support shaft 12V and the tilted rotatable shaft 10T are rotated 180 degrees which reverses the amount and direction of the tilted rotatable shaft 10T from +6.0 degrees toward the sun' shown in FIG. 5E to −6.0 degrees 'away from' the sun shown in FIG. 5C.

Figures 6, 7:
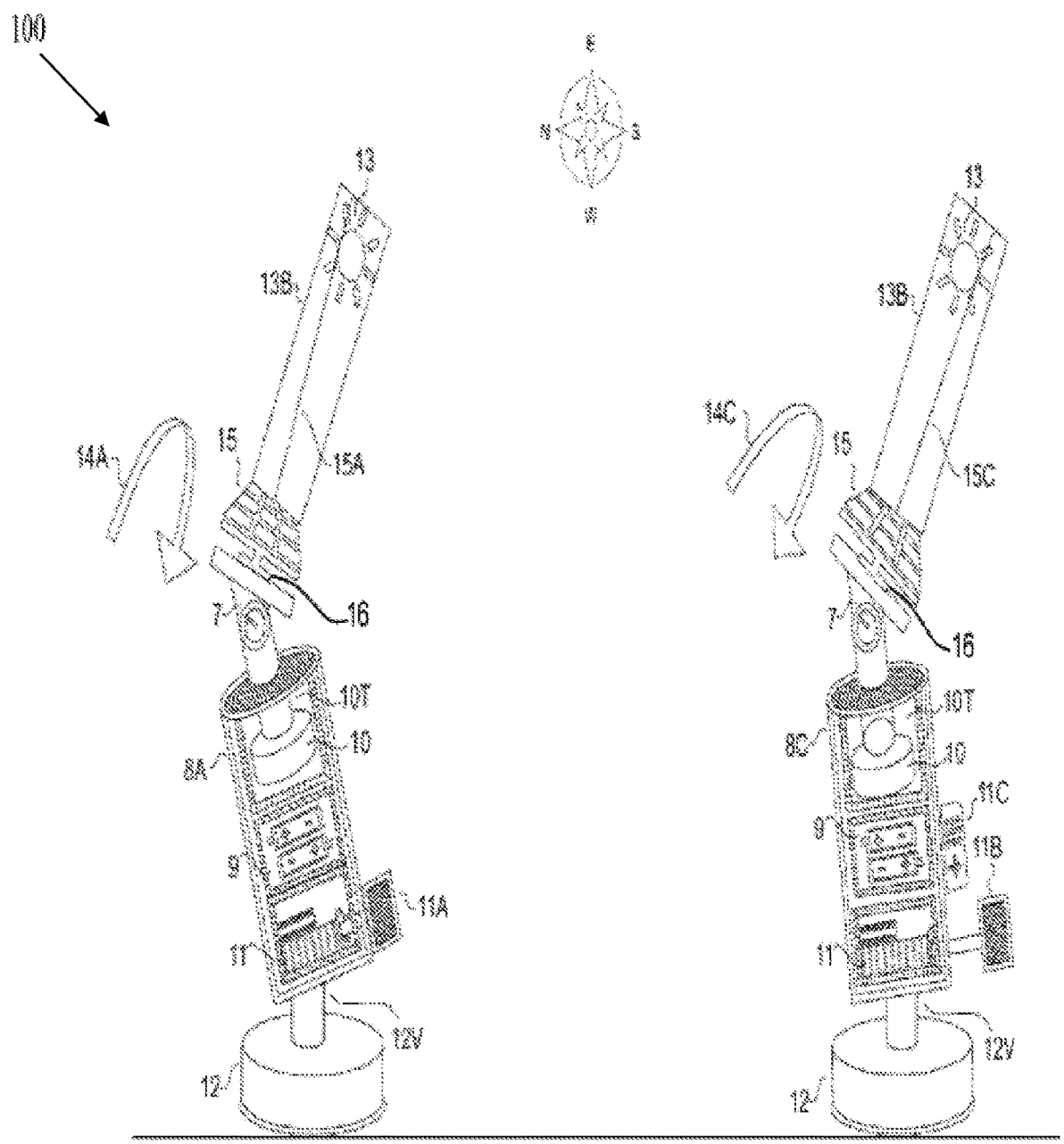
FIG. 6 is a perspective side view of the photovoltaic (P-V) solar panel tracking system wherein the AOI between the sun's direct rays and the solar panels' normal line is −6.0 degrees whenever the solar panel rotator shaft support arm's tilt angle is −18.0 degrees away from the sun and the earth's axial obliquity is +12.0 degrees toward the sun.
FIG. 7 is a perspective side view of the photovoltaic (P-V) solar panel tracking system wherein the AOI between the sun's direct rays and the solar panels' normal line is +6.0 degrees whenever the solar panel rotator shaft support arm's tilt angle of −6.0 degrees away from the sun and the earth's axial obliquity is +12.0 degrees toward the sun.
Figure 8:
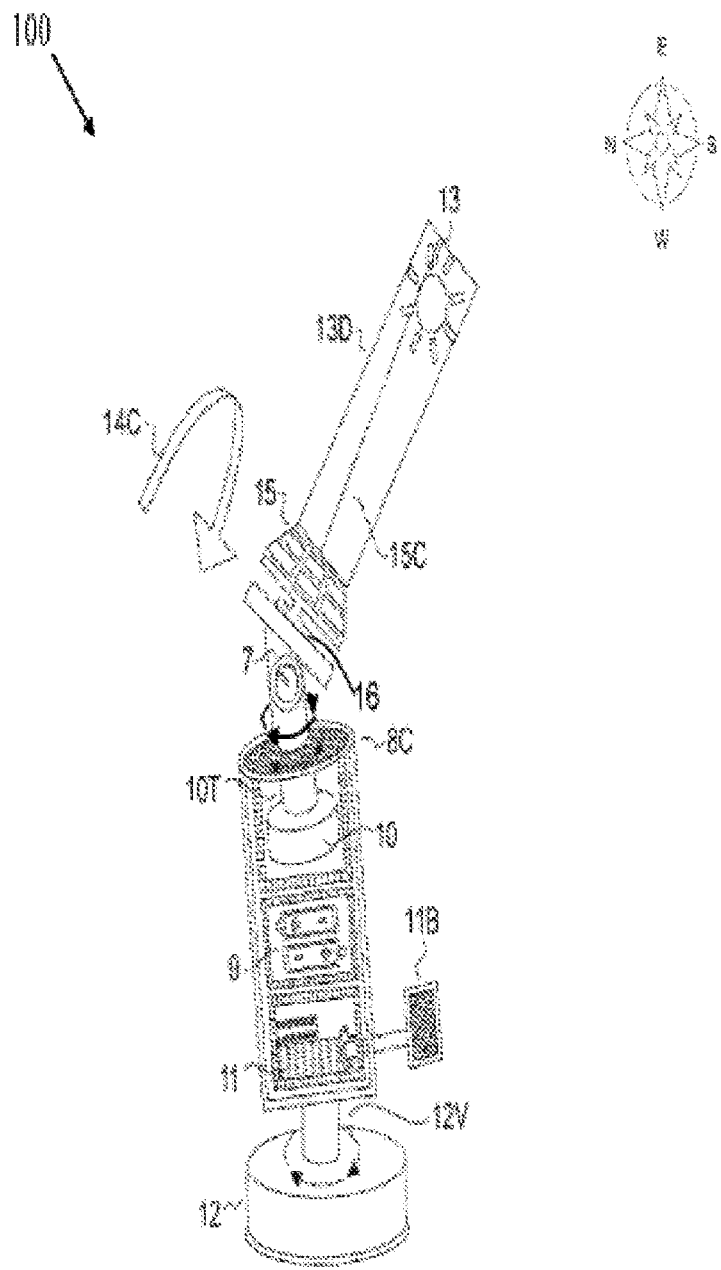
FIG. 8 is a perspective side view of the photovoltaic (P-V) solar panel tracking system wherein the AOI between the sun's direct rays and the solar panels' normal line is −6.0 degrees whenever the solar panel rotator shaft support arm's tilt angle is −6.0 degrees away from the sun and the earth's axial obliquity is zero degrees as it is on the hemisphere's autumnal equinox.
Figure 9:
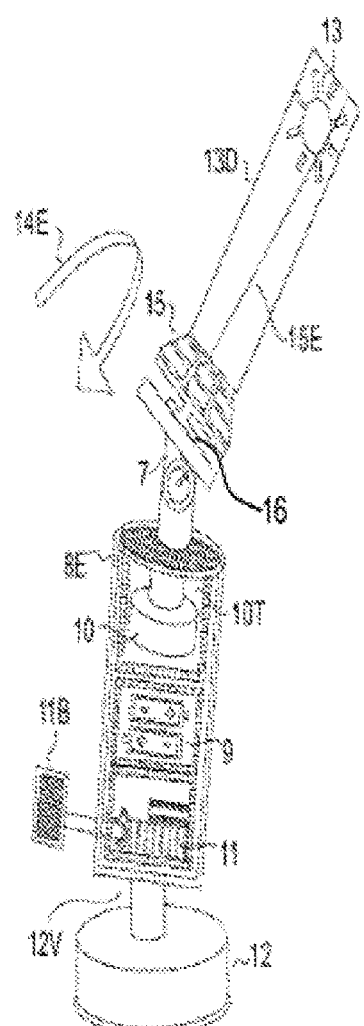
FIG. 9 is a perspective side view of the photovoltaic (P-V) solar panel tracking system wherein the AOI between the sun's direct rays and the solar panels' normal line is +6.0 degrees whenever the solar panel rotator shaft support arm's tilt angle is +6.0 degrees toward the sun and the earth's axial obliquity is zero degrees as it is on the hemisphere's autumnal equinox.
Figures 10, 11:
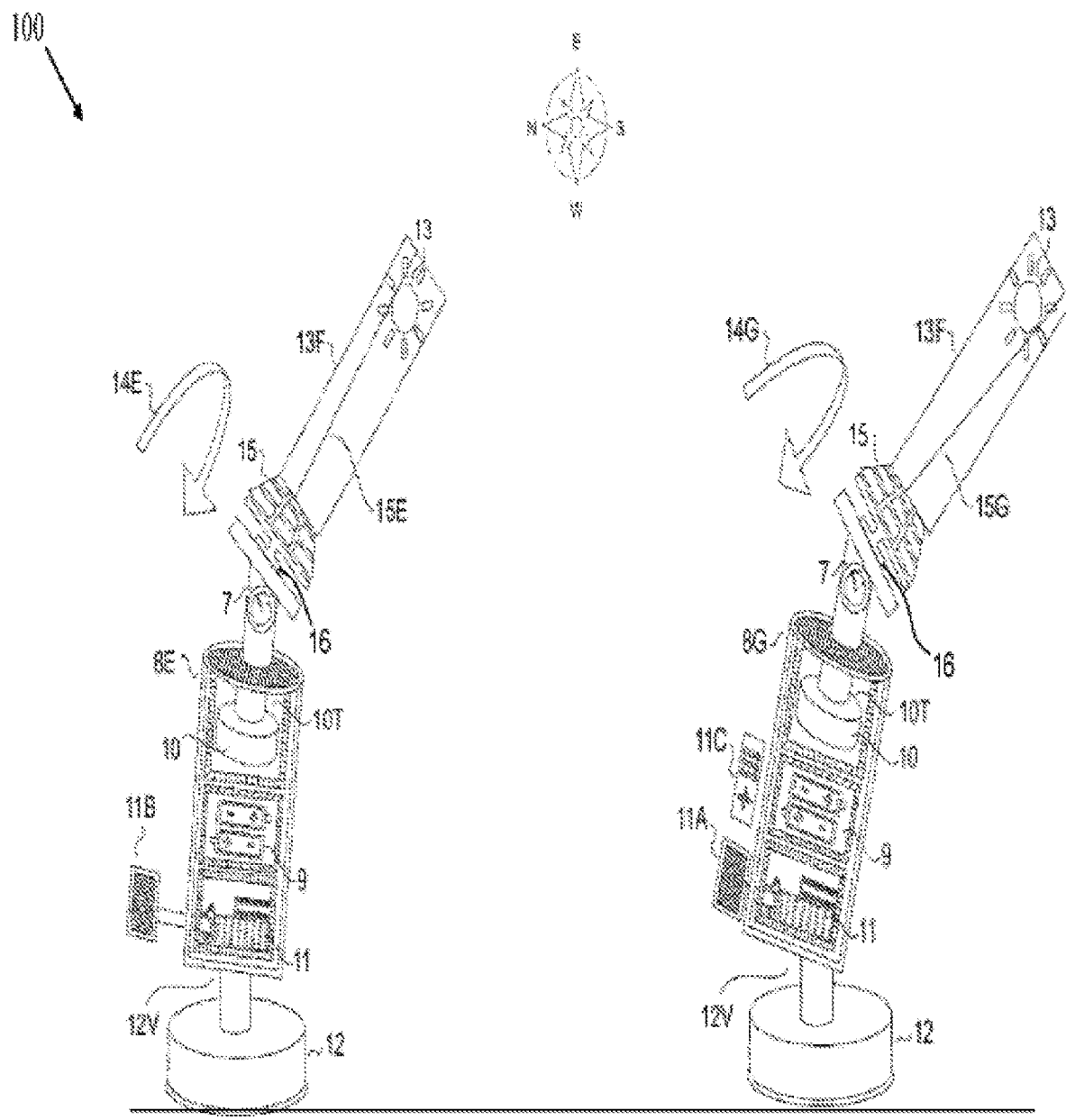
FIG. 10 is a perspective side view of the photovoltaic (P-V) solar panel tracking system wherein the AOI between the sun's direct rays and the solar panels' normal line is −6.0 degrees whenever the solar panel rotator shaft support arm's tilt angle is +6.0 degrees toward the sun and the earth's axial obliquity is −12.0 degrees away from the sun.
FIG. 11 is a perspective side view of the photovoltaic (P-V) solar panel tracking system wherein the AOI between the sun's direct rays and the solar panels' normal line is +6.0 degrees whenever the solar panel rotator shaft support arm's tilt angle is +18.0 degrees toward the sun and the earth's axial obliquity is −12.0 degrees away from the sun.
Figures 14, 15:
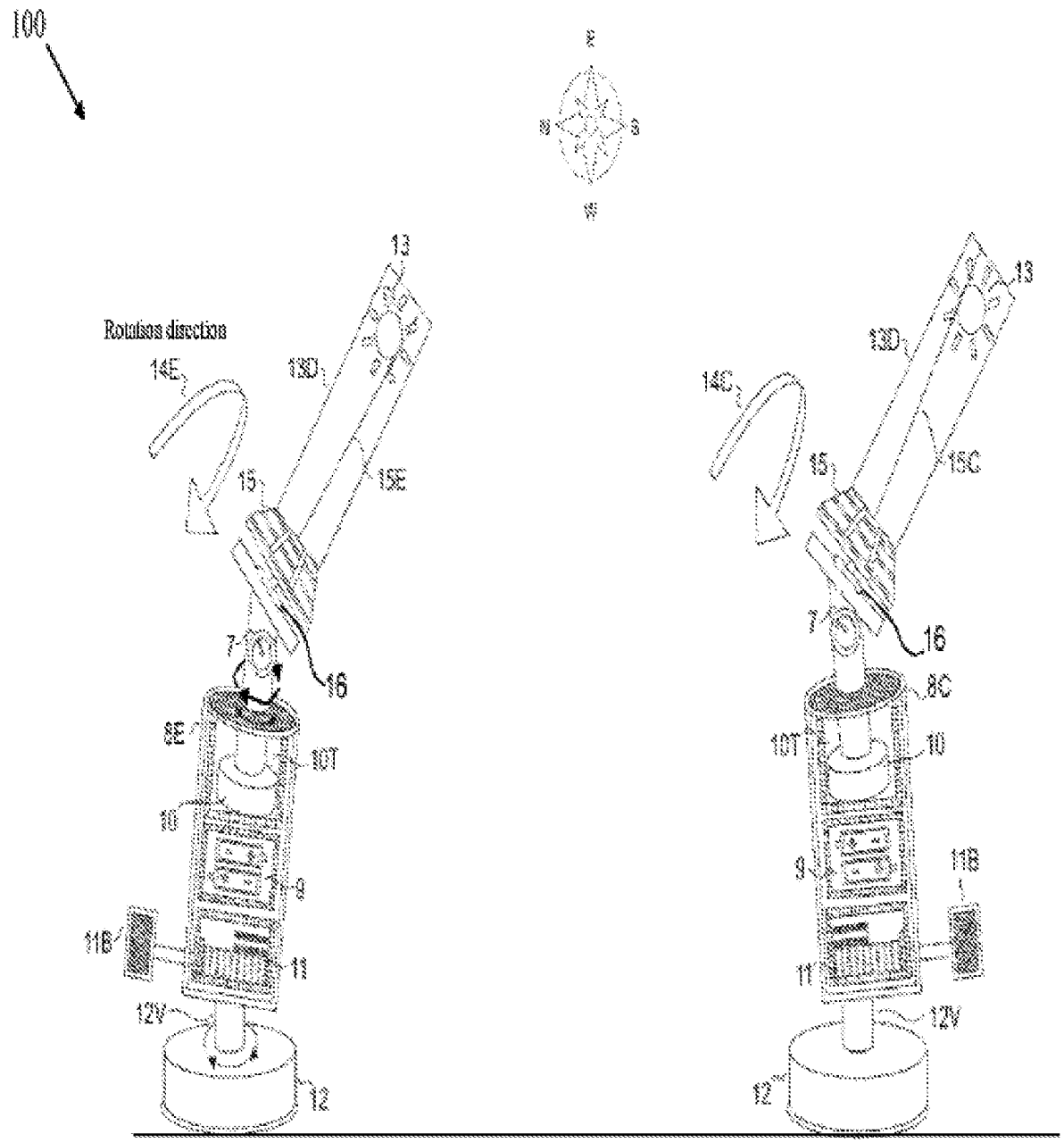
FIG. 14 is a perspective side view of the photovoltaic (P-V) solar panel tracking system wherein the AOI between the sun's direct rays and the solar panels' normal line is +6.0 degrees whenever the solar panel rotator shaft support arm's tilt angle is +6.0 degrees toward the sun and the earth's axial obliquity is zero degrees as it is on the hemisphere's vernal equinox.
FIG. 15 is a perspective side view of the photovoltaic (P-V) solar panel tracking system wherein the AOI between the sun's direct rays and the solar panels' normal line is −6.0 degrees whenever the solar panel rotator shaft support arm's tilt angle is −6.0 degrees away from the sun and the earth's axial obliquity is zero degrees as it is on the hemisphere's vernal equinox.
Figures 16, 17:
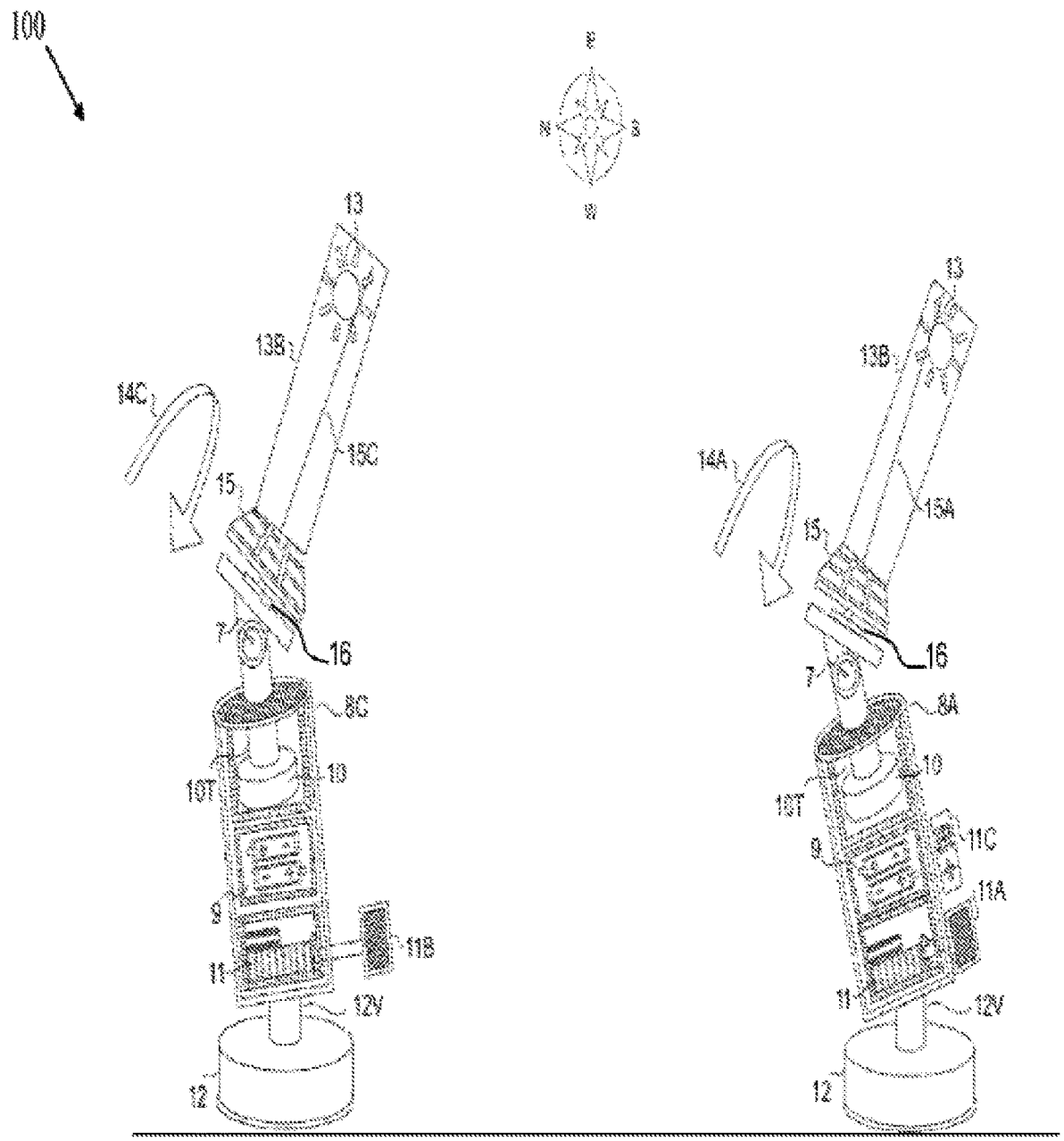
FIG. 16 is a perspective side view of the photovoltaic (P-V) solar panel tracking system wherein the AOI between the sun's direct rays and the solar panels' normal line is +6.0 degrees whenever the solar panel rotator shaft support arm's tilt angle is −6.0 degrees away from the sun and the earth's axial obliquity is +12.0 degrees toward the sun.
FIG. 17 is a perspective side view of the photovoltaic (P-V) solar panel tracking system wherein the AOI between the sun's direct rays and the solar panels' normal line is −6.0 degrees whenever the solar panel rotator shaft support arm's tilt angle is −18.0 degrees away from the sun and the earth's obliquity of +12.0 degrees toward the sun.

FIG. 6C is a perspective side view of the photovoltaic (P-V) solar panel tracking system wherein the AOI between the sun's direct rays and the solar panels' normal line is +6.0 degrees whenever the solar panel rotator shaft support arm's tilt angle is −6.0 degrees away from the sun and the earth's axial obliquity is +12.0 degrees toward the sun.

FIG. 6A is a perspective side view of the photovoltaic (P-V) solar panel tracking system 100 wherein the AOI between the sun's direct rays and the solar panels' normal line is −6.0 degrees whenever the solar panel rotator shaft support arm's tilt angle is −18.0 degrees away from the sun and the earth's obliquity of +12.0 degrees toward the sun.

Approximately one month after the vernal equinox when the amount of the earth's obliquity is +12.0 degrees toward the sun, the angle of the tilted rotatable shaft 10T is adjusted from −6.0 degrees 'away from' the sun shown in FIG. 6C to −18.0 degrees 'away from' the sun shown in FIG. 6A by the full retraction of the actuator's 11 linear piston's 11B position to its 11A position.

Research shows that photovoltaic (P-V) solar panels capture 99% of the available diurnal solar energy whenever the 'Angle Of Incidence' (AOI) between the normal line of their energy collecting surfaces and the sun's direct rays is less than +/−8.0 degrees of both their planar surfaces' azimuthal (X) and altitudinal (Y) axes.

The primary goal of all active solar trackers is to either constantly or periodically reorient the azimuthal axis and/or altitudinal axis of one or more P-V solar panels' normal line to remain 'at or close' to the sun's position (and its direct rays when available) for all or some portion of its 'apparent' daily (diurnal) orbital path at the solar tracker's location.

Every coordinate on the earth's surface is constantly rotating on the earth's +23.5 degree tilted axis, 360 degrees each 24 hours in the counterclockwise direction while simultaneously revolving 360 degrees each 365.25 days around the sun's stationary position in the center of the earth's elliptical shaped orbital path around it.

If a rack of solar panels at any coordinate on the earth's surface on any given time of day or night on any day of the year is rotated in +15.0 degree increments each hour in the clockwise direction starting when the solar panels 'azimuthal axes' 'normal' lines are −7.5 degrees west of the sun's position, it will result in an azimuthal AOI range of −7.5 to +7.5 degrees each hour between the solar panel's 15 azimuthal axes' normal line and the sun's position.

The invention's 'Method of Operation' (MO) to limit the maximum azimuthal AOI between the sun's daily (diurnal) orbital path and the solar panels 'normal' to less than +/−8.0 degrees is by its use of the afore described periodic clockwise +15 degree hourly rotations of a solar rack of multiple P-V solar panels.

The photovoltaic (P-V) solar panel tracking system's 100 operating design utilizes a high capacity, solar rechargeable battery to supply a D/C powered device to rotate a rack of multiple P-V solar panels 15 attached to a rotatable tilted shaft 10T via a 360 degree swivel device 16 at the angle of the installation site's latitude shown on an inclinometer 7.

The diurnal +15.0 degree clockwise rotations are performed by the invention's rotator device each 'hour on the hour' when the azimuthal X axes' 'normal' of the solar panels is −7.5 degrees east of the sun's position before the +15 degree rotation to where they are +7.5 degrees west of the sun's position after the rotation.

Limiting the azimuthal maximum AOI between solar panels' X axes' 'normal' line and the sun's position to less than +/−8.0 degrees during the earth's constant speed, constant direction daily rotation on its 23.5 degree axis at every one of the 181 latitudes of the earth's surface for any desired time period is a relatively easy task for an active solar tracking mounting system to accomplish.

Limiting the altitudinal maximum AOI between solar panels' Y axes' 'normal' line and the sun's position to less than +/−8.0 degrees during every day of the earth's yearly elliptical shaped revolution around the sun at every one of the 181 latitudes of the earth surface for any desired time period is a relatively difficult task for an active solar tracking mounting system to accomplish compared to the X axis.

The sunrise, sunset times and apogee (zenith) of the sun's diurnal orbital path at every location of the earth's surface are all determined by the amount and direction of the earth's +23.5 degree axial tilt or "obliquity" (with respect to the device's installation site's location) whose amount varies daily and whose direction reverses every six months not only each day at the same location but are different on the same day of every location at each of the other 180 different latitudes.

The AOI between the P-V solar panels' altitudinal Y axis' 'normal' line and the sun's direct rays is equal to the sum of the earth's daily obliquity and the angle of the invention's tilted rotatable shaft 10T whose maximum is "less than" +/−6.0 degrees year round at every latitude.

Approximately 'two months before' the summer solstice when the earth's obliquity is +12.0 degrees toward the sun, the angle of tilted rotatable shaft 10T is −18.0 degrees away from the sun shown in FIG. 1A for a −6.0 degree maximum AOI between the sun's slightly and irregularly increasing diurnal orbital path's apogee and the solar panels' 'normal' 15A.

Approximately two months later 'on the summer solstice, the earth's obliquity reaches its maximum +23.5 degrees toward the sun and the angle of the tilted rotatable shaft 10T remains at −18.0 degrees away from the sun for a +5.5 degree AOI between the sun's diurnal orbital path's apogee and the solar panels' 'normal' line 15A on summer's solstice.

Approximately 'two months after' the summer solstice when the earth's obliquity decreases to +12.0 degrees toward the sun, the angle of the tilted rotatable shaft 10T is −18.0 degrees away from the sun shown in FIG. 1A for a −6.0 degree maximum AOI between the sun's slightly and irregularly decreasing diurnal orbital path's apogee and the solar panels' 'normal' line 15A.

The invention's maximum altitudinal AOI of −6.0 degrees on 'the first day' of the approximately two month period prior to the summer solstice and maximum altitudinal −6.0 degree AOI on the last day of the approximate two month period after the summer solstice are both less than +/−8.0 degrees and will therefore capture over 99% of the available P-V energy within the sun's direct rays during the entire 'four month period' surrounding the summer solstice.

Approximately 'one month prior to the autumnal equinox' when the earth's obliquity is +12.0 degrees toward the sun, the angle of tilted rotatable shaft 10T is increased from −18.0 degrees away from the sun shown in FIG. 1A to −6.0 degrees away from the sun shown in FIG. 1C for a +6.0 degree AOI between the sun's slightly & irregularly decreasing diurnal orbital path's apogee and the solar panels' 'normal' 15C.

Approximately one month later 'on the autumnal equinox' when the earth's obliquity is 0.0 degrees and reverses direction from toward the sun to away from the sun, the direction of the tilted rotatable shaft 10T reverses direction from −6.0 degrees away from the sun shown in FIG. 2C to +6.0 degrees toward the sun shown in FIG. 2E for a +6.0 degree AOI between the sun's slightly and irregularly decreasing diurnal orbital path's apogee and the solar panels' 'normal' 15E.

Approximately 'one month after' the autumnal equinox when the earth's obliquity is −12.0 degrees away from the sun, the angle of tilted rotatable shaft 10T is increased from +6.0 degrees toward the sun shown in FIG. 3E to +18.0 degrees toward the sun shown in FIG. 3G for a +6.0 degree AOI between the sun's slightly and irregularly decreasing diurnal orbital path's apogee and the solar panels' 'normal' 15G.

From the invention's maximum altitudinal AOI of −6.0 degrees on the first day of the approximately one month period before to the autumnal equinox to the maximum +6.0 degree AOI on the last day of the approximate one month period after the autumnal equinox are both less than +/−8.0 degrees and will therefore capture over 99% of the available P-V energy within the sun's direct rays during the entire two month period surrounding the autumnal equinox.

Approximately 'two months before' the winter solstice when the earth's obliquity is −12.0 degrees away from the sun, the angle of tilted rotatable shaft 10T is increased from +6.0 degrees toward the sun shown in FIG. 3E to +18.0 degrees toward the sun shown in FIG. 3G for an AOI of +6.0 degrees between the sun's slightly and irregularly decreasing diurnal orbital path's apogee and the solar panels' 'normal' 15G.

Approximately two months later 'on the winter solstice' when the earth's yearly orbit around the sun reaches its maximum obliquity of −23.5 degrees away from the sun and the angle of the tilted rotatable shaft 10T is +18.0 degrees toward from the sun, for a −5.5 degree AOI between the sun's diurnal orbital path's apogee and the solar panels' 'normal' 15G on winter's solstice.

Approximately 'two month after' the winter solstice when the earth's obliquity decreases to −12.0 degrees away from the sun, the angle of the tilted rotatable shaft 10T is +18.0 degrees toward the sun shown in FIG. 4G for a +6.0 degree AOI between the sun's slightly and irregularly decreasing diurnal orbital path's apogee and the solar panels' 'normal' 15G.

The invention's maximum altitudinal AOI of +6.0 degrees on 'the first day' of the approximately two month period prior to the winter solstice and maximum altitudinal +6.0 degree AOI on the last day of the approximate two month period after the summer solstice are both less than +/−8.0 degrees and will therefore capture over 99% of the available P-V energy within the sun's direct rays during the entire 'four month period' surrounding the winter solstice.

Approximately 'one month prior' to the vernal equinox when the earth's obliquity is −12.0 degrees away from the sun, the angle of tilted rotatable shaft 10T is decreased from +18.0 degrees toward the sun shown in FIG. 4G to +6.0 degrees toward the sun shown in FIG. 4E for a −6.0 degree AOI between the sun's slightly and irregularly increasing diurnal orbital path's apogee and the solar panels' 'normal' 15E.

Approximately 'one month later' on the vernal equinox when the earth's obliquity is 0.0 degrees the earth's obliquity reverses direction from away from the sun to toward the sun, the direction of the tilted rotatable shaft 10T is reversed from +6.0 degrees toward the sun shown in FIG. 5E to −6.0 degrees away from the sun shown in FIG. 5C for a −6.0 degree AOI between the sun's slightly and irregularly increasing diurnal orbital path's apogee and the solar panels' 'normal' 15C.

Approximately 'one month after' the vernal equinox' when the earth's obliquity is +12.0 degrees toward the sun, the angle of tilted rotatable shaft 10T is decreased from −6.0 degrees away from the sun shown in FIG. 6C to −18.0 degrees away from the sun shown in FIG. 6A for a −6.0 degree AOI between the sun's slightly and irregularly increasing diurnal orbital path's apogee and the solar panels' 'normal' 15A.

While the present general inventive concept has been illustrated by description of several example embodiments, and while the illustrative embodiments have been described in detail, it is not the intention of the applicant to restrict or in any way limit the scope of the general inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings. Additional modifications will readily appear to those skilled in the art. Accordingly, departures may be made from such details without departing from the spirit or scope of applicant's general inventive concept.

What is claimed is:

1. A solar tracking system comprising:
a base member;
a first shaft rotatably coupled to the base member;
a support arm pivotably coupled to the first shaft;
a second shaft having a first end and an opposing second end, the first end rotatably coupled to the support arm;
a solar rack pivotably coupled to the second end of the second shaft;
a mass positioner configured to change an angle between the support arm and the first shaft by moving a predetermined mass between a first position and a second position;
a tilt angle adjuster to adjust a tilt angle between the solar rack and a longitudinal axis of the second shaft; and
a swivel base disposed between the solar rack and the tilt angle adjuster configured to allow the solar rack to rotate.

2. The solar tracking system of claim 1, wherein the tilt angle is equal to a latitude of where the base member is located.

3. The solar tracking system of claim 2, wherein the solar rack includes at least one photovoltaic energy collector panel.

4. The solar tracking system of claim 1, further comprising a first rotator device coupled to the support arm and configured to rotate the second shaft.

5. The solar tracking system of claim 2, further comprising a second rotator device coupled to the base member and configured to rotate the first shaft.

6. The solar tracking system of claim 5, further comprising a rechargeable battery connected to at least one of the first rotator device and the second rotator device.

7. The solar tracking system of claim 5, wherein the mass positioner further includes a linear actuator disposed within the support arm.

8. The solar tracking system of claim 1, wherein the mass positioner includes an actuator to move the predetermined mass between the first position and the second position.

9. The solar tracking system of claim 8, wherein the support arm is positioned at a first angle with respect to the base member when the mass is located at the first position.

10. The solar tracking system of claim 9, wherein the support arm is positioned at a second angle with respect to the base member when the mass is located at the second position.

11. The solar tracking system of claim 10, wherein the first angle is 18 degrees and the second angle is 6 degrees.

* * * * *